UNITED STATES PATENT OFFICE.

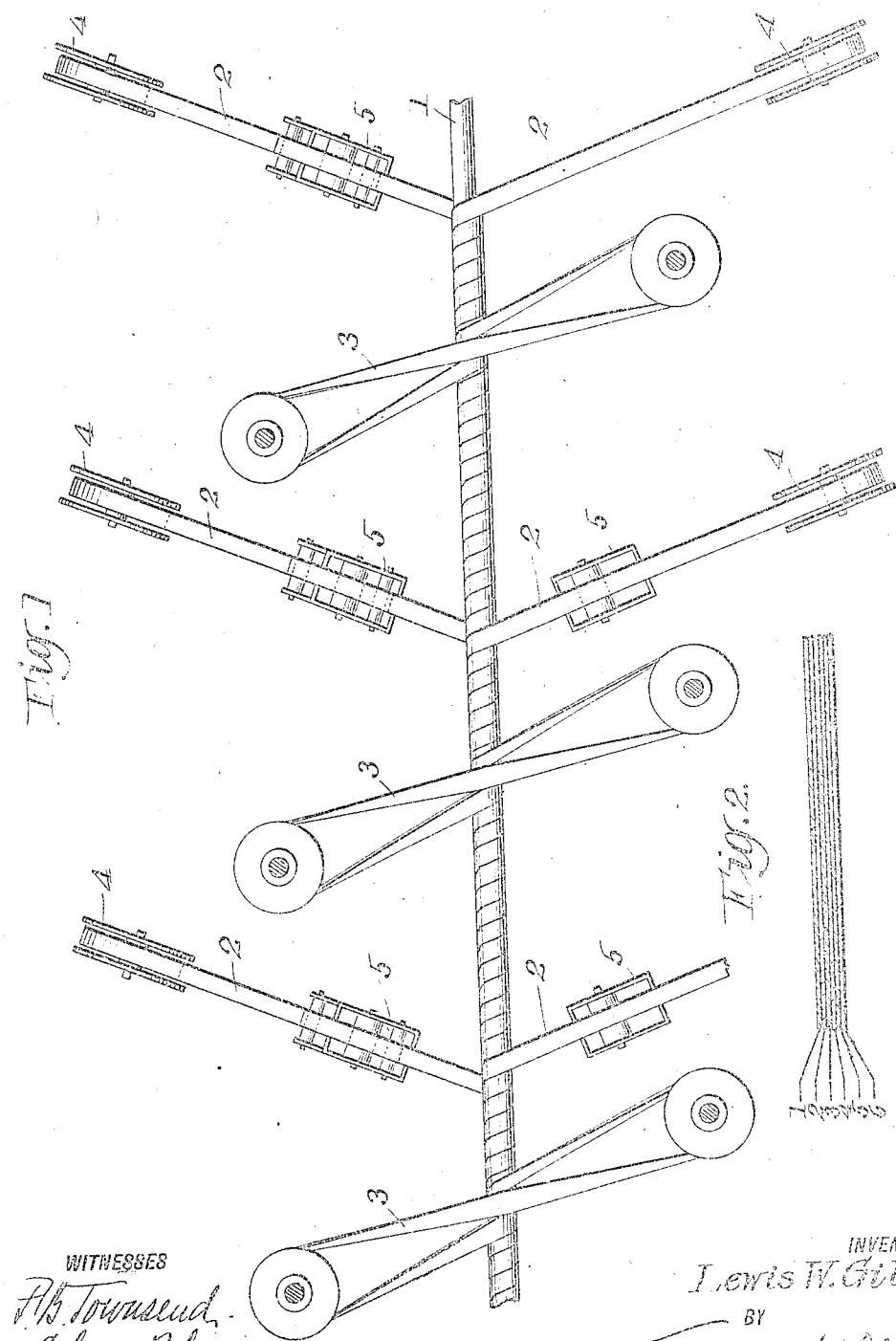

LEWIS W. GILL, OF NEW YORK, N. Y., ASSIGNOR TO GENERAL CONTAINER CORPORATION, OF NEW YORK, N. Y., A CORPORATION OF DELAWARE.

PAPER-CYLINDER MANUFACTURE.

1,253,871.

Specification of Letters Patent.

Patented Jan. 15, 1918.

Application filed May 7, 1915. Serial No. 26,516.

*To all whom it may concern:*

Be it known that I, LEWIS W. GILL, a citizen of the United States, and a resident of New York, in the county of New York and State of New York, have invented certain new and useful Improvements in Paper-Cylinder Manufacture, of which the following is a specification.

This invention relates to the manufacture of tubes or cylinders of paper in which a plurality of layers of paper are spirally wound upon each other and united together by an adhesive.

The object of the invention is the production of a paper tube or cylinder of maximum strength as well as low cost and in which objects of any nature desired can be shipped.

The invention contemplates the formation of a tube or cylinder by winding strips of paper on a mandrel and securing a firm union of the individual layers by the application of an adhesive to the meeting or contacting surfaces thereof. One of the features of the invention is the employment of silicate of soda or a mixture containing silicate of soda as the adhesive used to unite the spirally wound layers of paper which make up the tube or cylinder. Heretofore it has been the practice in manufacturing tubes of this nature to use ordinary glue or paste as the adhesive but when dealing with cylinders of large size or where great strength, rapid output or shipping perishable goods is required, adhesives of this character have made a total failure of meeting the requirements of a package which will answer these purposes. No person in so far as I am aware has previously been able to utilize silicate of soda as an adhesive for uniting the layers of a spirally wound tube wherein the layers are continuously and spirally fed to a mandrel on which the tube is formed.

Among the advantages of utilizing silicate of soda as an ingredient to unite the layers appear the following:—

1. It is only a fraction in cost as compared to glue, paste or other adhesives heretofore used in making paper tubes.

2. It is not subject to dampness and weather conditions after being applied as is glue, paste and the other adhesives heretofore used nor does it absorb dampness or moisture.

3. After its application to the tube, the tube does not draw rats, mice, &c., which eat through the paper as in the case of glue or paste being used.

4. It is not injurious to any contents which may be shipped in the tube—tubes adhered together with glue, paste or other dextrin adhesives cannot be used for shipping many goods, for instance fruits and flour.

5. A tube, the layers of which are secured by silicate of soda, is much stiffer, more solid, more dense, many times more rigid and stronger, harder and more tenacious than when glue, paste or the other adhesives heretofore employed are used.

6. Silicate of soda sets and hardens much quicker than glue or paste, thereby increasing output, and has greater adhesive qualities.

The invention consists in the improved method of tube winding and in the article hereinafter more particularly described and then specified in the claims.

In the accompanying drawings, Figure 1 illustrates the tube diagrammatically in the course of manufacture.

Fig. 2 is a diagrammatic section of the wall of the tube showing the arrangement of staggering the layers so that no two joints will be in line.

1 indicates the mandrel to which a plurality of individual paper strips 2 are spirally fed, the strips being pressed on each other on the mandrel and spirally fed longitudinally thereof by presser belts 3 as is usual in the art of spiral tube making.

In the diagrammatic illustration six strips of paper are fed to the mandrel whereby a tube having a wall of six layers thick is attained, it being understood that any desired number of strips may be fed according to the number of layers desired in the wall of the tube. It will be understood that the operation of the machine is continuous, the paper strips being continuously drawn from the rolls 4 by the belts 3 and each strip in its travel to the mandrel 1 passes over an applicator tank 5 which applies liquid silicate of soda contained therein to the surface of the paper strip 2. The silicate is applied to the paper in the desired thickness after which it is untouched until being pressed on the next lower layer on the mandrel. Owing to the fact that silicate of soda sets immediately upon contact with a foreign object it cannot be scraped or its thickness regulated after application to the paper at the tanks 5. It will be obvious that the first layer applied is not provided with any adhesive.

In order to secure the maximum strength in the wall of the tube, the layers are arranged, when six strips of paper are used, as indicated diagrammatically in Fig. 2, so that no two joints are in line. It will be understood that no matter how many strips or layers are employed all joints are out of line.

As illustrated in Fig. 2, the layers where a six ply tube is desired are numbered 1 to 6 inclusive. The joint or meeting edges of the first layer is spanned by layer number 2 the joint of No. 1 coming in the center of No. 2. The joint of number 3 is brought to one side of the center of the strip No. 2 while the joint of No. 4 occurs on the opposite side of the center. The joint of No. 5 is to one side of the joint in No. 3 and out of line with the joint in No. 1 while the joint in No. 6 is at the opposite side of the center and out of line with the joint in No. 4. The manner of so feeding the strips of paper to the mandrel is effected by adjusting the relative positions of the strips as applied to the mandrel as will be readily understood by those skilled in the art.

What I claim as my invention is:—

1. The process of manufacturing paper tubing consisting in continuously feeding a plurality of paper strips spirally on to a mandrel and spreading an adhesive containing silicate of soda over a surface of said strips to adhere them together while at the same time maintaining the silicated surface untouched between the application of the silicate and its engagement with another strip.

2. The process of manufacturing paper tubing consisting in applying an adhesive containing silicate of soda to a plurality of continuously moving paper strips fed to a mandrel and spirally wound thereon and maintaining the silicated surface of the strips untouched between the application thereon and the engagement with the other strips.

Signed at New York, in the county of New York and State of New York, this 5th day of May, A. D. 1915.

LEWIS W. GILL.

Witnesses:
F. B. TOWNSEND,
EDWIN ROBINSON.